United States Patent
You et al.

(10) Patent No.: US 11,880,055 B2
(45) Date of Patent: Jan. 23, 2024

(54) POLARIZING PLATE AND DISPLAY DEVICE INCLUDING SAME

(71) Applicant: Samsung SDI Co., Ltd., Yongin-si (KR)

(72) Inventors: Jung Hun You, Suwon-si (KR); Bong Choon Kim, Suwon-si (KR); Sang Hum Lee, Suwon-si (KR); Jun Mo Koo, Suwon-si (KR); Dong Yoon Shin, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 170 days.

(21) Appl. No.: 17/630,469

(22) PCT Filed: Jul. 17, 2020

(86) PCT No.: PCT/KR2020/009450
§ 371 (c)(1),
(2) Date: Jan. 26, 2022

(87) PCT Pub. No.: WO2021/025324
PCT Pub. Date: Feb. 11, 2021

(65) Prior Publication Data
US 2022/0252773 A1  Aug. 11, 2022

(30) Foreign Application Priority Data
Aug. 2, 2019 (KR) .......... 10-2019-0094303

(51) Int. Cl.
*G02B 5/30* (2006.01)
*G02B 1/14* (2015.01)
(Continued)

(52) U.S. Cl.
CPC ............. *G02B 5/3033* (2013.01); *G02B 1/14* (2015.01); *G02B 5/223* (2013.01); *G02F 1/133509* (2013.01); *G02F 1/133528* (2013.01)

(58) Field of Classification Search
None
See application file for complete search history.

(56) References Cited

U.S. PATENT DOCUMENTS

| 2016/0195653 A1* | 7/2016 | Lee ................ G02B 5/305 |
| | | 427/163.1 |
| 2016/0195767 A1* | 7/2016 | Lee ................ B29C 71/04 |
| | | 359/486.01 |

(Continued)

FOREIGN PATENT DOCUMENTS

| JP | 2014-167547 A | 9/2014 |
| JP | 2018-092032 A | 6/2018 |

(Continued)

OTHER PUBLICATIONS

Korean Office Action dated Dec. 27, 2022 issued in corresponding Korean Application No. 10-2019-0094303 (4 pages).

(Continued)

*Primary Examiner* — Shan Liu
(74) *Attorney, Agent, or Firm* — Lewis Roca Rothgerber Christie LLP

(57) ABSTRACT

A polarizing plate and a display apparatus including the same. The polarizing plate includes: a polarizer and a protective film stacked at least on one surface of the polarizer, wherein the polarizing plate includes at least a depolarization region in an in-plane direction thereof, and the depolarization region has a maximum absorbance of 0.5 to 1.5 in the wavelength range of 380 nm to 420 nm and a light transmittance ratio (ratio of light transmittance at a wavelength of 590 nm to light transmittance at a wavelength of 400 nm) of 1 to 2.

8 Claims, 2 Drawing Sheets

(51) Int. Cl.
G02B 5/22 (2006.01)
G02F 1/1335 (2006.01)

(56) References Cited

U.S. PATENT DOCUMENTS

2016/0229135 A1* 8/2016 Lee ................. B05D 3/0486
2017/0090086 A1* 3/2017 Goto ................ C09D 129/04
2017/0254939 A1 9/2017 Lee et al.
2018/0186109 A1* 7/2018 Byun .............. G02F 1/133528

FOREIGN PATENT DOCUMENTS

| KR | 10-2015-0037551 A | 4/2015 |
| KR | 10-2015-0086159 A | 7/2015 |
| KR | 10-2016-0130360 A | 11/2016 |
| KR | 10-2017-0037854 A | 4/2017 |
| KR | 10-2018-0081197 A | 7/2018 |
| KR | 10-2019-0074168 A | 6/2019 |

OTHER PUBLICATIONS

Korean Office Action dated May 31, 2022, issued in corresponding Korean Patent Application No. 10-2019-0094303, 4 pages.
International Search Report of PCT/KR2020/009450, dated Oct. 22, 2020, 4 pages.

* cited by examiner

[Figure 1]
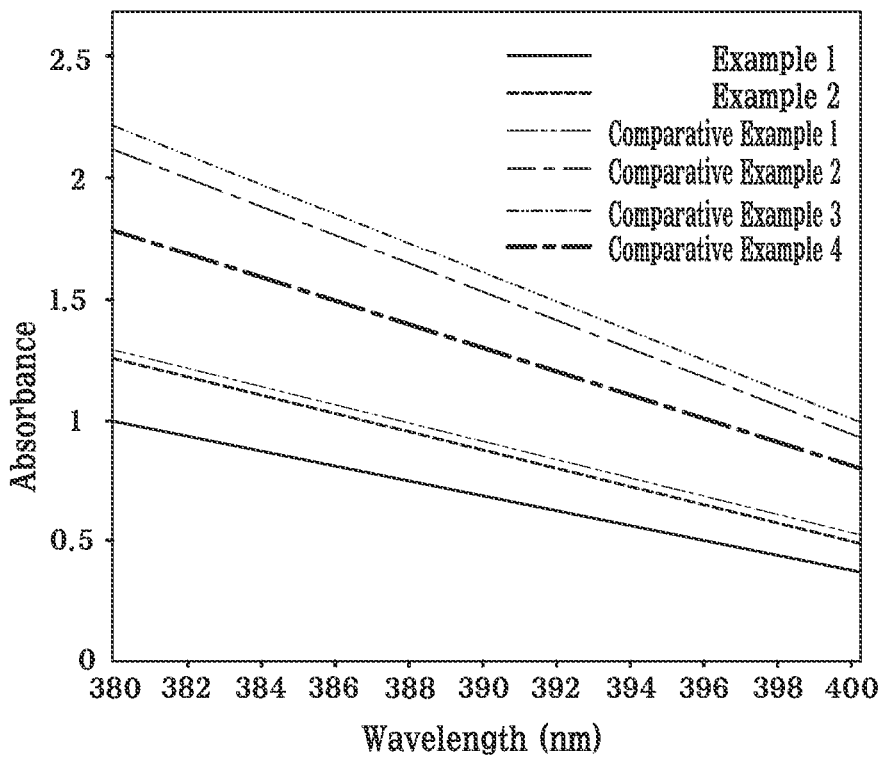
[Figure 2]
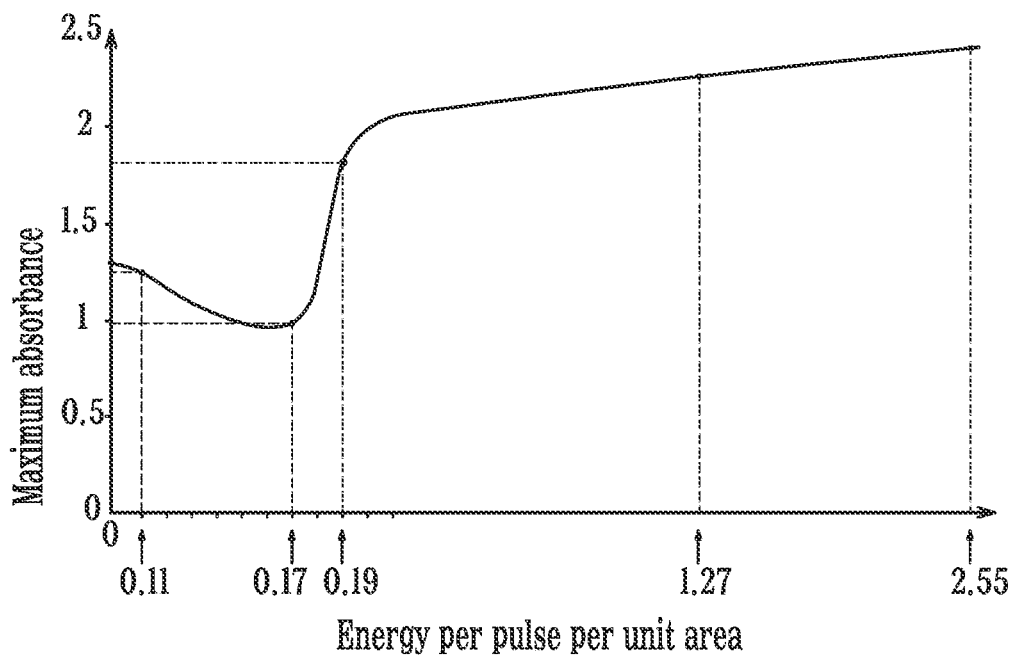

[Figure 3]
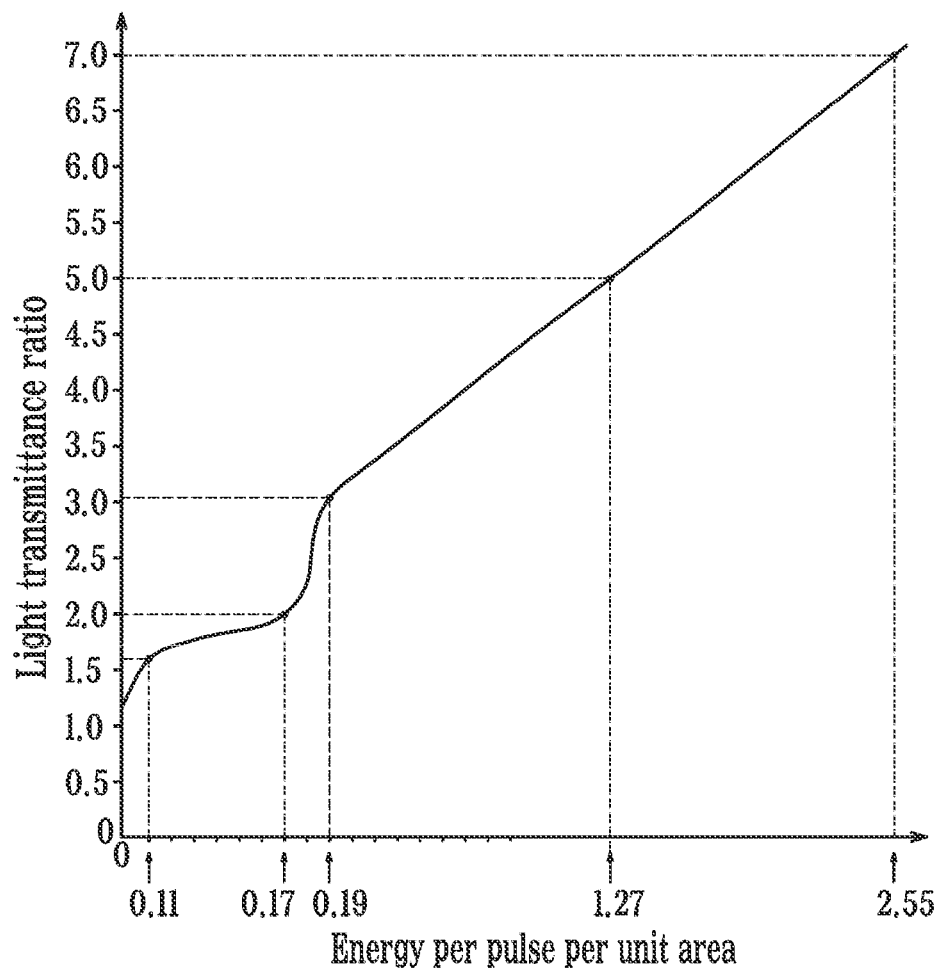

POLARIZING PLATE AND DISPLAY DEVICE INCLUDING SAME

CROSS-REFERENCE TO RELATED APPLICATION(S)

This application is a U.S. National Phase Patent Application of International Application Number PCT/KR2020/009450, filed on Jul. 17, 2020, which claims priority of Korean Patent Application Number 10-2019-0094303, filed on Aug. 2, 2019, the entire content of each of which is incorporated herein by reference.

TECHNICAL FIELD

The present invention relates to a polarizing plate and a display apparatus including the same. More particularly, the present invention relates to a polarizing plate, which has a depolarization region capable of improving a color tone and definition of an image while preventing image deformation upon photographing therethrough, and a display apparatus including the same.

BACKGROUND ART

A polarizing plate has a function of polarizing light emitted through a liquid crystal panel of an optical display. The polarizing plate includes a polarizer and a protective film stacked on at least one surface of the polarizer. In general, the optical display has not only a screen display function, but also various other functions including a camera function, a video communication function, and the like. Since the polarizing plate does not allow transmittance of 50% or more of light due to a polarization function thereof, the polarizing plate can provide poor visibility when used in a camera region of the optical display. To address this problem, there is a need for formation of a depolarization region at least in some region of the polarizing plate.

In recent years, an existing depolarization region alone has a limit in fulfilling increasing tendency towards a sharper image with higher resolution. Conventionally, the optical display realizes the camera function through improvement in light transmittance of the depolarization region. However, the improvement in light transmittance alone can provide a poor color tone and definition of a photographed image and can cause severe deformation of the image.

The background technique of the present invention is disclosed in Korean Patent Laid-open Publication No. 10-2017-0037854 and the like.

DISCLOSURE

Technical Problem

It is one object of the present invention to provide a polarizing plate that has a depolarization region enabling remarkable improvement in camera performance by allowing a sharp image having a good color tone and brightness to be photographed without image deformation.

It is another object of the present invention to provide a polarizing plate that has a depolarization region with remarkable transmittance so as to be applied to an infrared (IR) sensor and the like.

Technical Solution

One aspect of the present invention relates to a polarizing plate.

1. The polarizing plate includes: a polarizer and a protective film stacked on at least one surface of the polarizer, wherein the polarizing plate includes at least a depolarization region in an in-plane direction thereof, and the depolarization region has a maximum absorbance of 0.5 to 1.5 in the wavelength range of 380 nm to 420 nm and a light transmittance ratio (ratio of light transmittance at a wavelength of 590 nm to light transmittance at a wavelength of 400 nm) of 1 to 2.

2. In Embodiment 1, the depolarization region may have an ion concentration ratio (ratio of $I_5^-$ ion concentration to $I_3^-$ ion concentration) of 1 to 2.

3. In Embodiments 1 and 2, the depolarization region may have a minimum absorbance of 0.1 to 1 in the wavelength range of 380 nm to 420 nm.

4. In Embodiments 1 to 3, the polarizing plate may further include a polarization region and the maximum absorbance of the polarization region in the wavelength range of 380 nm to 420 nm may be greater than or smaller than the maximum absorbance of the depolarization region in the wavelength range of 380 nm to 420 nm.

5. In Embodiment 4, the polarization region may have a smaller ratio of light transmittance at a wavelength of 590 nm to light transmittance at a wavelength of 400 nm than the depolarization region.

6. In Embodiment 4, the polarization region may have a higher ratio of $I_5^-$ ion concentration to $I_3^-$ ion concentration than the depolarization region.

7. In Embodiments 1 to 6, the polarizer may include a polarizer dyed with at least one selected from among iodine and dichroic dyes.

A display apparatus according to the present invention includes the polarizing plate according to the present invention.

Advantageous Effects

The present invention provides a polarizing plate that has a depolarization region enabling remarkable improvement in camera performance by allowing a sharp image having a good color tone and brightness to be photographed without image deformation.

DESCRIPTION OF DRAWINGS

FIG. 1 is a graph depicting absorbance versus wavelength in depolarization regions of polarizing plates of Examples and Comparative Examples, in which the x-axis indicates wavelength and the y-axis indicates absorbance.

FIG. 2 is a graph depicting maximum absorbance in the wavelength range of 380 nm to 420 nm versus energy per pulse per unit area upon irradiation with laser beams in a depolarization region of a polarizing plate according to one embodiment of the present invention.

FIG. 3 is a graph depicting a ratio of light transmittance at a wavelength of 590 nm to light transmittance at a wavelength of 400 nm depending on energy per pulse per unit area upon irradiation with laser beams in the depolarization region of the polarizing plate according to one embodiment of the present invention.

BEST MODE

Embodiments of the present invention will be described in detail with reference to the accompanying drawings to provide thorough understanding of the invention to those skilled in the art. It should be understood that the present invention may be embodied in different ways and is not limited to the following embodiments.

As used herein to represent a specific numerical range, the expression "X to Y" means a value greater than or smaller than X and less than or equal to Y (X≤ and ≤Y).

Hereinafter, a polarizing plate according to one embodiment of the present invention will be described.

The polarizing plate includes a polarizer and a protective film stacked on at least one surface of the polarizer. The polarizing plate has a depolarization region in at least some in-plane regions of the polarizing plate.

The depolarization region refers to a region of the polarizing plate in which inherent polarization performance of the polarizing plate is absent or reduced upon application to an image display apparatus, such as a mobile phone, a monitor or an IR sensor, and may also be used as a region to which a camera will be provided. The depolarization region may be formed to occupy 90% or less or 50% or less of the entire in-plane region of the polarizing plate, but is not limited thereto.

The depolarization region may have a single light transmittance of 50% or more, specifically 50% to 100%, more specifically 55% to 100%, at a wavelength of 380 nm to 780 nm. Further, the depolarization region may have a degree of polarization of 50% or less, specifically 0% to 5%. Within this range, the depolarization region can be applied to a camera for image photographing.

The depolarization region may have a ratio of light transmittance at a wavelength of 590 nm to light transmittance at a wavelength of 400 nm (hereinafter, "light transmittance ratio") of 1 to 2 and a maximum absorbance of 0.5 to 1.5 in the wavelength range of 380 nm to 420 nm.

In general, the depolarization region secures a light transmittance of 40% or more at a wavelength of 380 nm to 780 nm to allow image photographing when applied to a camera. In addition, the depolarization region tends to have light transmittance increasing as the wavelength increases. However, increase in light transmittance of the depolarization region alone has a limit in optimization of a color tone and brightness of an image upon image photographing through the camera.

According to the present invention, it is possible to prevent deformation of an image photographed through the camera while improving the color tone and brightness of the image by controlling the ratio of light transmittance at a wavelength of 400 nm to light transmittance at a wavelength of 590 nm in the depolarization region to fall in the range of 1 to 2 while securing a maximum absorbance of 0.5 to 1.5 in the wavelength range of 380 nm to 420 nm.

Next, the depolarization region according to the present invention will be described in more detail.

In the depolarization region, the maximum absorbance in the wavelength range of 380 nm to 420 nm (for example, 380 nm, 390 nm, 400 nm, 410 nm, or 420 nm) is taken into account. The inventors of the present invention confirmed that definition, color tone and brightness of an image obtained through the depolarization region depend not only upon light transmittance of the depolarization region, but also upon absorbance at a short wavelength, particularly at a wavelength in the range of 380 nm to 420 nm. Accordingly, the maximum absorbance in the wavelength range of 380 nm to 420 nm was controlled to be within a specific range of the present invention, that is, in the range of 0.5 to 1.5 (for example, 0.5, 0.6, 0.7, 0.8, 0.9, 1, 1.1, 1.2, 1.3, 1.4, or 1.5). A wavelength in the range of 380 nm to 420 nm pertains to a short wavelength range in which the absorbance can affect definition of an image. Preferably, the maximum absorbance is in the range of 0.9 to 1.5.

In the depolarization region, the light transmittance ratio is taken into account. In general, the depolarization region has light transmittance increasing with increasing wavelength. However, the inventors of the present invention confirmed that an image obtained through the depolarization region can exhibit good properties in terms of definition, color tone and brightness without deformation of the image by increasing the light transmittance depending upon wavelength while controlling the light transmittance ratio to be in a specific range of the present invention, that is, in the range of 1 to 2 (for example, 1, 1.1, 1.2, 1.3, 1.4, 1.5, 1.6, 1.7, 1.8, 1.9, or 2).

When both the maximum absorbance and the light transmittance ratio are satisfied, the polarizing plate can secure good definition and color tone of an image obtained through the depolarization region while preventing deformation of the image. Specific means for reaching the maximum absorbance and the light transmittance ratio according to the present invention will be described in detail below.

The depolarization region may have a light transmittance of 30% or more, specifically 30% to 80%, at a wavelength of 400 nm. Within this range, the polarizing plate can easily reach the light transmittance ratio within the above range and allows easy treatment of a camera image based on data of a blue region obtained through improvement in short wavelength transmittance.

The depolarization region may have a light transmittance of 50% or more, specifically 50% to 95%, at a wavelength of 590 nm. Within this range, the polarizing plate can easily reach the light transmittance ratio within the above range and can form a more neutral and colorless high transmittance portion.

In one embodiment, the depolarization region may have an ion concentration ratio (ratio of $I_5^-$ ion concentration to $I_3^-$ ion concentration) of 1 to 2 (for example, 1, 1.1, 1.2, 1.3, 1.4, 1.5, 1.6, 1.7, 1.8, 1.9, or 2). In general, the depolarization region is formed by decomposing iodine ions ($I_5^-$, $I_3^-$, and the like) contained in the polarizer. According to the present invention, the ratio of the long wavelength region to the short wavelength region may be reduced so as to have an ion concentration ratio ($I_5^-/I_3^-$) in the range of 1 to 2, thereby forming a more neutral and colorless high transmittance portion. Only V ions in the long wavelength region are dissociated due to rapid degradation, thereby causing increase in the ion concentration ratio ($I_5^-/I_3^-$) to greater than 2 while reducing single transmittance and generating a yellowish color.

In one embodiment, the depolarization region may have a minimum absorbance of 0.1 to 1 (for example, 0.1, 0.2, 0.3, 0.4, 0.5, 0.6, 0.7, 0.8, 0.9, or 1), specifically 0.1 to 0.5, in the wavelength range of 380 nm to 420 nm (for example, at a wavelength of 380, 390, 400, 410, or 420 nm).

The depolarization region may be formed through laser treatment with respect to a polarizer or a stack structure of the polarizer and a protective film stacked on at least one surface of the polarizer.

The polarizer may include a polarizer formed by dyeing with at least one selected from among iodine and dichroic dyes. The polarizer may be manufactured by a typical method known to those skilled in the art.

The polarizer may be manufactured through dyeing, stretching, crosslinking, and color compensation. In the polarizer manufacturing method, the sequence of dyeing and stretching is not particularly limited. That is, the polarizer may be manufactured by sequentially dyeing and stretching a polyvinyl alcohol film or vice versa, by sequentially stretching and dyeing the polyvinyl alcohol film, or by simultaneously dyeing and stretching the polyvinyl alcohol film.

The polyvinyl alcohol film may be a typical polyvinyl alcohol film used in manufacture of a polarizer in the art. Specifically, the polyvinyl alcohol film may be formed of polyvinyl alcohol or derivatives thereof. The polyvinyl alcohol film may have a degree of polarization of 1,000 to 5,000, a degree of saponification of 80 mol % to 100 mol %, and a thickness of 1 μm to 30 μm, specifically 3 μm to 30 μm. Within these ranges, the polyvinyl to alcohol film can be used in manufacture of the polarizer.

The polyvinyl alcohol film may be subjected to washing and swelling before dyeing and stretching. Foreign matter can be removed from the polyvinyl alcohol film by washing the polyvinyl alcohol film. Swelling of the polyvinyl alcohol film allows more efficient dyeing or stretching of the polyvinyl alcohol film. Swelling may be performed by leaving the polyvinyl alcohol film in a swelling bath that contains an aqueous solution, as well-known to those skilled in the art. Temperature and swelling treatment of the swelling bath are not particularly limited. The swelling bath may further contain boric acid, an inorganic acid, a surfactant, and the like, the content of which may be regulated.

The polyvinyl alcohol film may be dyed in a dyeing bath that contains at least one selected from among iodine and dichroic dyes. In the dyeing process, the polyvinyl alcohol film may be dipped in a dyeing solution, which may be an aqueous solution containing the iodine and dichroic dyes. Specifically, iodine is supplied from an iodine-based dye, which may include at least one selected from among potassium iodide, hydrogen iodide, lithium iodide, sodium iodide, zinc iodide, lithium iodide, aluminum iodide, aluminum iodide, and copper iodide. The dyeing solution may be an aqueous solution containing 1 wt % to 5 wt % of the at least one selected from among the iodine and dichroic dyes. Within this range, the polarizer can have the degree of polarization within a certain range to be used in a display apparatus.

The swelling bath may have a temperature of 20° C. to 45° C. and the polyvinyl alcohol film may be dipped in the swelling bath for 10 seconds to 300 seconds. Within this range, the polarizer can have a high degree of polarization.

By stretching the dyed polyvinyl alcohol film in a stretching bath, at least one selected from among the iodine and dichroic dyes in the polyvinyl alcohol film is aligned to provide polarization properties to the polyvinyl alcohol film. Specifically, stretching may be thy stretching or wet stretching. Dry stretching may be inter-roll stretching, compressive stretching, heating roll stretching, or the like; and wet stretching may be performed in a wet stretching bath containing water at 35° C. to 65° C. The wet stretching bath may further contain boric acid to improve a stretching effect.

The polyvinyl alcohol film may be stretched in a predetermined elongation, specifically in a total elongation of 5 to 7 times, specifically 5.5 to 6.5 times. Within this range of elongation, the polyvinyl alcohol film can be prevent from being cut or creased and can realize a polarizer having a high degree of polarization and high transmittance. Stretching is uniaxial stretching and the polyvinyl alcohol film may be subjected to single-stage stretching or multi-stage stretching such as double stage stretching, triple-stage stretching, and the like, thereby allowing formation of a thin polarizer without fracture.

Although treatment of the polyvinyl alcohol film is illustrated as being performed in the sequence of dyeing and stretching in the above description, dyeing and stretching may be performed in the same reaction bath.

Before stretching the dyed polyvinyl alcohol film or dyeing the stretched polyvinyl alcohol film, the polyvinyl alcohol film may be subjected to crosslinking in a crosslinking bath. Crosslinking is a process for more strongly dyeing the polyvinyl alcohol film with at least one selected from among the iodine and dichroic dyes and boric acid may be used as a crosslinking agent. The crosslinking agent may further include a phosphoric acid compound, potassium iodide, and the like in order to improve a crosslinking effect.

The dyed and stretched polyvinyl alcohol film may be subjected to color compensation in a color compensation bath. For color compensation, the dyed and stretched polyvinyl alcohol film is dipped in the color compensation bath filled with a color compensation solution containing potassium iodide. This process improves durability of the polarizer by reducing color values of the polarizer and removing iodine anions $I^-$ from the polarizer. The color compensation bath has a temperature of 20° C. to 45° C. and the polyvinyl alcohol film is dipped therein for 10 seconds to 300 seconds.

The polarizer may have a thickness of 10 μm to 50 μm, specifically 10 μm to 30 μm. Within this thickness range, the polarizer can be used in the polarizing plate.

The depolarization region may be formed by irradiating the polarizer with femtosecond laser beams having an energy per pulse per unit area of greater than 0 $J/cm^2 \cdot pulse$ to 0.17 $\mu cm^2 \cdot pulse$.

Herein, "energy per pulse per unit area" is defined as a value obtained by dividing the total irradiation energy of a femtosecond laser by the total area of the polarizer irradiated with femtosecond laser beams for each of wavelengths upon irradiation of the polarizer.

According to the present invention, the polarizer is irradiated with the femtosecond laser beams while regulating the energy per pulse per unit area so as to reach the maximum absorbance and the light transmittance ratio described above through uniform decomposition of $I_3^-$ ions and $I_5^-$ ions among iodine ions in the polarizer. Further, the number of wavelengths may be regulated within the wavelength range in laser irradiation.

If the energy per pulse per unit area exceeds 0.17 $J/cm^2 \cdot pulse$ in irradiation of the polarizer with the femtosecond laser beams, difference in degree of decomposition between $I_3^-$ ions and $I_5^-$ ions among the iodine ions in the polarizer can be significantly increased. That is, $I_5^-$ ions can be more decomposed than $I_3^-$ ions among the iodine ions in the polarizer to provide an uneven decomposition ratio between the $I_5^-$ ions and the $I_3^-$ ions, thereby making it difficult to realize the depolarization region having a light transmittance ratio and a maximum absorbance at a wavelength of 380 nm to 420 nm in the aforementioned ranges. Further, if the energy per pulse per unit area exceeds 0.17 $J/cm^2 \cdot pulse$, excessive energy applied to the polarizer can be transferred to the polyvinyl alcohol film constituting the polarizer, thereby causing thermal deformation of the polarizer.

FIG. 2 is a graph depicting maximum absorbance in the wavelength range of 380 nm to 420 nm versus energy per pulse per unit area upon irradiation with femtosecond laser beams at a certain wavelength in the depolarization region of the polarizing plate according to one embodiment of the present invention. Although not shown in FIG. 2, the maximum absorbance of 0.5 to 1.0 can be achieved by controlling the energy per pulse per unit area to 0.17 $J/cm^2 \cdot pulse$ or less while changing the number of wavelengths of femtosecond laser beams emitted in the wavelength range of 510 nm to 520 nm and/or in the wavelength range of 340 nm to 346 nm.

FIG. 3 is a graph depicting a ratio of light transmittance at a wavelength of 590 nm to light transmittance at a wavelength of 400 nm depending on energy per pulse per unit area upon irradiation with femtosecond laser beams at a certain wavelength in the depolarization region of the polarizing plate according to the embodiment of the present invention.

Referring to FIG. 3, as the energy per pulse per unit area increases, the light transmittance ratio increases. However, it can be seen that, when the energy per pulse per unit area exceeds 0.17 J/cm$^2$·pulse, the maximum absorbance and the light transmittance ratio in the depolarization region rapidly increase.

In one embodiment, the energy per pulse per unit area may be in the range of 0.01 J/cm$^2$·pulse to 0.17 J/cm$^2$·pulse.

In one embodiment, the depolarization region may be realized by irradiation with femtosecond laser beams only in the wavelength range of 510 nm to 520 nm. By irradiation with the femtosecond laser beams in this wavelength range, it is possible to realize the depolarization region having a light transmittance ratio and a maximum absorbance in the wavelength range of 380 nm to 420 nm in the aforementioned ranges. If the polarizer is irradiated with femtosecond laser beams having an energy per pulse per unit area of greater than 0.17 J/cm$^2$ pulse at a wavelength of greater than 52.0 nm, $I_5^-$ ions are more rapidly decomposed than $I_3^-$ ions and the depolarization region can have a light transmittance ratio of greater than 2 or a maximum absorbance of greater than 1.5 in the wavelength range of 380 nm to 420 nm.

Specifically, the depolarization region is realized by irradiation with feintosecond laser beams having a wavelength in the range of 510 nm to 520 nm, for example, a wavelength of 510 nm, 511 nm, 512 nm, 513 nm, 514 nm, 515 nm, 516 nm, 517 nm, 518 nm, 519 nm, or 520 nm, preferably 515 nm.

In another embodiment, the depolarization region is realized by irradiation with femtosecond laser beams having two or more wavelengths selected in the wavelength range of 340 nm to 346 nm and in the wavelength range of 510 nm to 520 nm, respectively. Within these wavelength ranges, the depolarization region having a light transmittance ratio and a maximum absorbance in the wavelength range of 380 nm to 420 nm in the aforementioned ranges according to the present invention can be realized. Further, even when the polarizer or the polarizing plate is left under high temperature and high humidity conditions for a long period of time, variation in the degree of polarization and/or light transmittance of the depolarization region is low, thereby providing good reliability.

Specifically, the depolarization region is realized by irradiation with femtosecond laser beams having a wavelength in the wavelength range of 340 am to 346 nm, for example, a wavelength of 340 nm, 341 nm, 342 nm, 343 nm, 344 nm, 345 am, or 346 nm, preferably 343 nm.

In one embodiment, the depolarization region is realized by irradiation with one femtosecond laser beam having a wavelength in the wavelength range of 510 nm to 520 nm and one femtosecond laser beam having a wavelength in the wavelength range of 340 am to 346 nm.

Advantageous effects of the present invention can be more efficiently realized by irradiation with femtosecond laser beam having wavelengths selected from the above wavelength ranges while regulating the intensity of the femtosecond laser beams in each wavelength range. Specifically, the femtosecond laser beam having a wavelength in the range of 340 nm to 346 nm may be emitted at an energy per pulse per unit area of 0.01 J/cm$^2$·pulse to 0.17 J/cm$^2$·pulse, preferably 0.11 J/cm$^2$·pulse to 0.17 J/cm$^2$·pulse. The femtosecond laser beam having a wavelength in the range of 510 nm to 520 nm may be emitted at an energy per pulse per unit area of 0.01 J/cm$^2$·pulse to 0.17 J/cm$^2$·pulse, preferably 0.15 J/cm$^2$·pulse to 0.17 J/cm$^2$·pulse, more preferably 0.11 J/cm$^2$·pulse to 0.17 J/cm$^2$·pulse, still more preferably 0.15 J/cm$^2$·pulse to 0.17 J/cm$^2$· pulse. Within this range, $I_2$, $I_3^-$, and $I_5^-$ ions present in a short wavelength range of 300 nm to 450 nm and in a short wavelength range of 450 nm to 560 nm can be effectively dissociated for a short period of time, thereby providing a light transmittance of 80% or more while preventing deterioration in transmittance due to recombination of iodine ions under high temperature and high humidity conditions.

In each of the wavelength ranges, the femtosecond laser beam may be emitted at a pulse width of 100 femtoseconds (fs) to 500 fs, preferably 200 fs to 400 fs, and a frequency of 100 kHz to 500 kHz, preferably 150 kHz to 350 kHz. Within these ranges, it is possible to form the depolarization region that does not suffer from surface carbonization or laser hatching on a processed surface thereof due to heat and a degree of precision of 50 μm, preferably 10 μm, at an irradiation interface thereof.

In each of the wavelength ranges, the femtosecond laser beam may be emitted for 1 second to 1,000 seconds, for example, 1 second to 100 seconds. Within this range, irradiation duration or the number of irradiation times can be increased under the above irradiation conditions without thermal deformation of the polarizer and the protective film, thereby forming a more neutral and colorless high transmittance portion.

The depolarization region may be formed by irradiating the polarizer with the femtosecond laser beam at the above energy per pulse per unit area. Alternatively, the depolarization region may be formed by irradiating the stack of the polarizer and the protective film stacked on at least one surface of the polarizer with the femtosecond laser beam at the above energy per pulse per unit area.

The protective film may be selected from among typical protective film used for polarizers. For example, the protective film may be formed of at least one resin selected from among cellulose resins including triacetylcellulose and the like, polyester resins including polyethylene terephthalate, polybutylene terephthalate, polyethylene naphthalate, polybutylene naphthalate, and the like, cyclic polyolefin resins, polycarbonate resins, polyether sulfone resins, polysulfone resins, polyamide resins, polyimide resins, polyolefin resins, polyarylate resins, polyvinyl alcohol resins, polyvinyl chloride resins, and polyvinylidene chloride resins.

The protective film may have a thickness of 10 μm to 100 μm, for example, 10 μm to 60 μm. Stacking may be performed using a bonding agent by a typical method known to those skilled in the art.

Next, a polarization region of the polarizing plate, that is, a region of the polarizing plate not irradiated with the femtosecond laser beam, will be described.

The polarization region may have a single light transmittance of 20% or more, specifically 40% to 50%, at a wavelength of 380 nm to 780 nm. In addition, the depolarization region may have a degree of polarization of 90% or more, specifically 90% to 100%. Within this range, the depolarization region of the polarizing plate can realize polarization performance in a display apparatus, thereby improving image quality.

In one embodiment, the polarization region may have a light transmittance ratio (light transmittance at a wavelength of 590 nm/light transmittance at a wavelength of 400 nm) of 0 to 2, In addition, the light transmittance ratio of the polarization region is lower than the light transmittance ratio of the depolarization region.

In one embodiment, the polarization region may have a maximum absorbance of 0.5 to 1.5 in the wavelength range of 380 nm to 420 nm. In addition, the maximum absorbance of the polarization region in the wavelength range of 380 nm to 420 nm may be greater than or smaller than the maximum absorbance of the depolarization region in the wavelength range of 380 nm to 420 nm.

In one embodiment, the polarization region may have an ion concentration ratio (ratio of $I_5^-$ ion concentration to $I_3^-$ ion concentration) ($I_5^-/I_3^-$) of 2 or more, specifically greater than to 3. Further, the ion concentration ratio ($I_5^-/I_3^-$) of the polarization region is greater than that of the depolarization region.

Next, a display apparatus according to one embodiment of the present invention will be described.

The display apparatus according to the present invention may include the polarizing plate or the polarizer according to the present invention. The display apparatus may include a liquid crystal display, an organic light emitting display, and the like. Further, the display apparatus may include a display apparatus including an IR sensor.

Next, the present invention will be described in more detail with reference to some examples. However, it should be noted that these examples are provided for illustration only and are not to be construed in any way as limiting the present invention.

Detailed specification of components in the following examples and comparative examples are as follows.

(1) Material of polarizer: Polyvinyl alcohol film (VF-PE3000, thickness: 30 µm, Kuraray Co., Ltd., JP)

(2) Protective film: Triacetylcellulose film (KC4UYW, thickness: 40 µm, Konica Co., Ltd., JP)

EXAMPLE 1

A polyvinyl alcohol film washed with water was subjected to swelling in a swelling bath filled with water at 30° C.

Then, the polyvinyl alcohol film was dipped in an aqueous solution containing 3 wt % of potassium iodide within a dyeing bath at 30° C. for 30 seconds to 200 seconds. The dyed polyvinyl alcohol film was transferred to a wet crosslinking bath filled with an aqueous solution containing 3 wt % of boric acid and having a temperature of 30° C. to 60° C. Next, the polyvinyl alcohol film was stretched to a total elongation of 6 times in an aqueous solution containing 3 wt % of boric acid and having a temperature of 50° C. to 60° C. to form a polarizer. A stack structure was prepared by bonding protective films to both surfaces of the polarizer via a bonding agent (Z-200, Nippon Goshei Co., Ltd.).

The stack was cut to a predetermined size and partially irradiated with a femtosecond laser beam having an energy per pulse per unit area of 0.17 J/cm² pulse at a wavelength of 515 nm, thereby forming a polarizing plate having a depolarization region.

EXAMPLES 2 TO 4

Polarizing plates each having a depolarization region were manufactured in the same manner as in Example 1 except that the wavelengths and energy per pulse per unit area were changed as listed in Table 1 in irradiation with ferntosecond laser beams.

COMPARATIVE EXAMPLE

A polarizing plate was manufactured in the same manner as in Example 1 except that irradiation with femtosecond laser beams was not performed.

COMPARATIVE EXAMPLE 2

A polarizing plate having a depolarization region was manufactured in the same manner as in Example 1 except that the stack was irradiated with a feintosecond laser beam having an energy per pulse per unit area of 1.27 J/cm² pulse at a wavelength of 515 nm.

COMPARATIVE EXAMPLE 3

A polarizing plate having a depolarization region was manufactured in the same manner as in Example 1 except that the stack was irradiated with a femtosecond laser beam having an energy per puke per unit area of 0.19 J/cm²·pulse at a wavelength of 515 nm.

COMPARATIVE EXAMPLE 4

A polarizing plate having a depolarization region was manufactured in the same manner as in Example 1 except that the stack was irradiated with a ferntosecond laser beam having an energy per pulse per unit area of 2.55 J/cm²·pulse at a wavelength of 515 nm.

The depolarization region of each of the polarizing plates manufactured in Examples 1 to 4 and Comparative Examples 2 to 4 was evaluated as to the following properties. Since the polarizing plates manufactured in Comparative Example 1 did not include the depolarization region, the following properties were evaluated with respect to the entirety of the polarizing plate. Results are shown in the following Table 1 and FIGS. 1 to 4.

(1) Maximum absorbance: Maximum absorbance in the wavelength range of 380 nm to 420 am was measured using a JASCO V730 spectrometer.

(2) Light transmittance according to wavelength (unit: %) and light transmittance ratio: Light transmittance of each polarizing plate at a wavelength of 380 nm to 780 nm was measured using a JASCO V730 spectrometer.

(3) Single transmittance (unit: %) and degree of polarization (unit: %) at a wavelength of 380 am to 780 nm: Single transmittance and the degree of polarization of the depolarization region at a wavelength of 380 nm to 780 nm were measured using a JASCO V730 spectrometer.

(4) Concentration ratio of $I_5^-$ ions to $I_3^-$ ($I_5^-/I_3^-$): Iodine ion concentration ratio was analyzed using a Raman spectrometer at a wavelength of 633 nm.

(5) Observation with naked eye: The depolarization region was observed with the naked eye. A neutral depolarization region free from surface damage was rated as ⊚; a non-neural depolarization region free from surface damage was rated as ○; a non-neural depolarization region that suffered from slight surface damage was rated as Δ; and a non-neural depolarization region that suffered from severe surface damage was rated as X

TABLE 1

|  | Example | | | | Comparative Example | | | |
| --- | --- | --- | --- | --- | --- | --- | --- | --- |
|  | 1 | 2 | 3 | 4 | 1 | 2 | 3 | 4 |
| Femtosecond | 515 nm (0.17) — | 515 nm (0.11) — | 515 nm (0.17) 343 nm (0.17) | 515 nm (0.11) 343 nm (0.11) | — — | 515 nm (1.27) — | 515 nm (0.19) — | 515 nm (2.55) — |
| Maximum absorbance | 0.99 | 1.23 | 0.95 | 1.12 | 1.28 | 2.12 | 1.79 | 2.22 |
| Light transmittance @400 nm | 43.4 | 31.6 | 43.0 | 32.1 | 29.9 | 10.1 | 15.9 | 11.4 |
| Light transmittance @590 nm | 86.6 | 51.8 | 86.0 | 60.1 | 35.3 | 56.1 | 49.6 | 80.1 |
| Light transmittance ratio | 1.99 | 1.64 | 2.0 | 1.87 | 1.18 | 5.55 | 3.12 | 7.03 |
| Single transmittance | 87 | 57 | 87 | 60 | 43 | 71 | 64 | 75 |
| Degree of polarization | 3.5 | 48 | 3.6 | 46 | 99.99 | 24.9 | 36.9 | 21.5 |
| $I^{5-}/I^{3-}$ | 1.4 | 2.0 | 1.5 | 2.0 | 2.7 | 2.3 | 2.2 | 2.5 |
| Observation with naked eye | ◎ | ○ | ◎ | ○ | — | X | Δ | X |

In Table 1, figures in parentheses indicate energy per pulse per unit area.

As shown in Table 1 and FIG. 4, each of the polarizing plates according to the present invention had a depolarization region satisfying both the maximum absorbance and the light transmittance ratio within the above ranges of the present invention, thereby providing good results in observation with the naked eye and allowing a sharp image having a good color tone and brightness to be photographed without image deformation. FIG. 2 and FIG. 3 show that an energy per pulse per unit area of 0.17 J/cm$^2$·pulse or less has a significance in implementation of the advantageous effects of the present invention.

Conversely, the depolarization region of each of the polarizing plates of Comparative Examples 2 to 4 failed to satisfy both the maximum absorbance and the light transmittance ratio within the above ranges of the invention was unclearly formed, thereby failing to implement the effects of the present invention, as shown in Table 1 and FIG. 4.

It should be understood that various modifications, changes, alterations, and equivalent embodiments can be made by those skilled in the art without departing from the spirit and scope of the invention.

The invention claimed is:

1. A polarizing plate comprising: a polarizer and a protective film stacked on at least one surface of the polarizer, wherein the polarizing plate comprises at least a depolarization region in an in-plane direction thereof, the depolarization region having a maximum absorbance of 0.5 to 1.5 in the wavelength range of 380 nm to 420 nm and a light transmittance ratio, which is a ratio of light transmittance at a wavelength of 590 nm to light transmittance at a wavelength of 400 nm, of 1 to 2.

2. The polarizing plate according to claim 1, wherein the depolarization region has an ion concentration ratio, which is a ratio of $I_5$_ion concentration to $I_3$_ion concentration, of 1 to 2.

3. The polarizing plate according to claim 1, wherein the depolarization region has a minimum absorbance of 0.1 to 1 in the wavelength range of 380 nm to 420 nm.

4. The polarizing plate according to claim 1, further comprising:
a polarization region, wherein the maximum absorbance of the polarization region in the wavelength range of 380 nm to 420 nm is greater than or smaller than the maximum absorbance of the depolarization region in the wavelength range of 380 nm to 420 nm.

5. The polarizing plate according to claim 4, wherein the polarization region has a smaller ratio of light transmittance at a wavelength of 590 nm to light transmittance at a wavelength of 400 nm than the depolarization region.

6. The polarizing plate according to claim 4, wherein the polarization region has a higher ratio of $I_5$_ion concentration to $I_3$_ion concentration than the depolarization region.

7. The polarizing plate according to claim 1, wherein the polarizer comprises a polarizer dyed with at least one selected from among iodine and dichroic dyes.

8. A display apparatus comprising the polarizing plate according to claim 1.

* * * * *